Oct. 18, 1927.
J. F. WAIT
1,646,372
PROCESS OF PRODUCING SODAMIDE
Filed Dec. 18, 1924
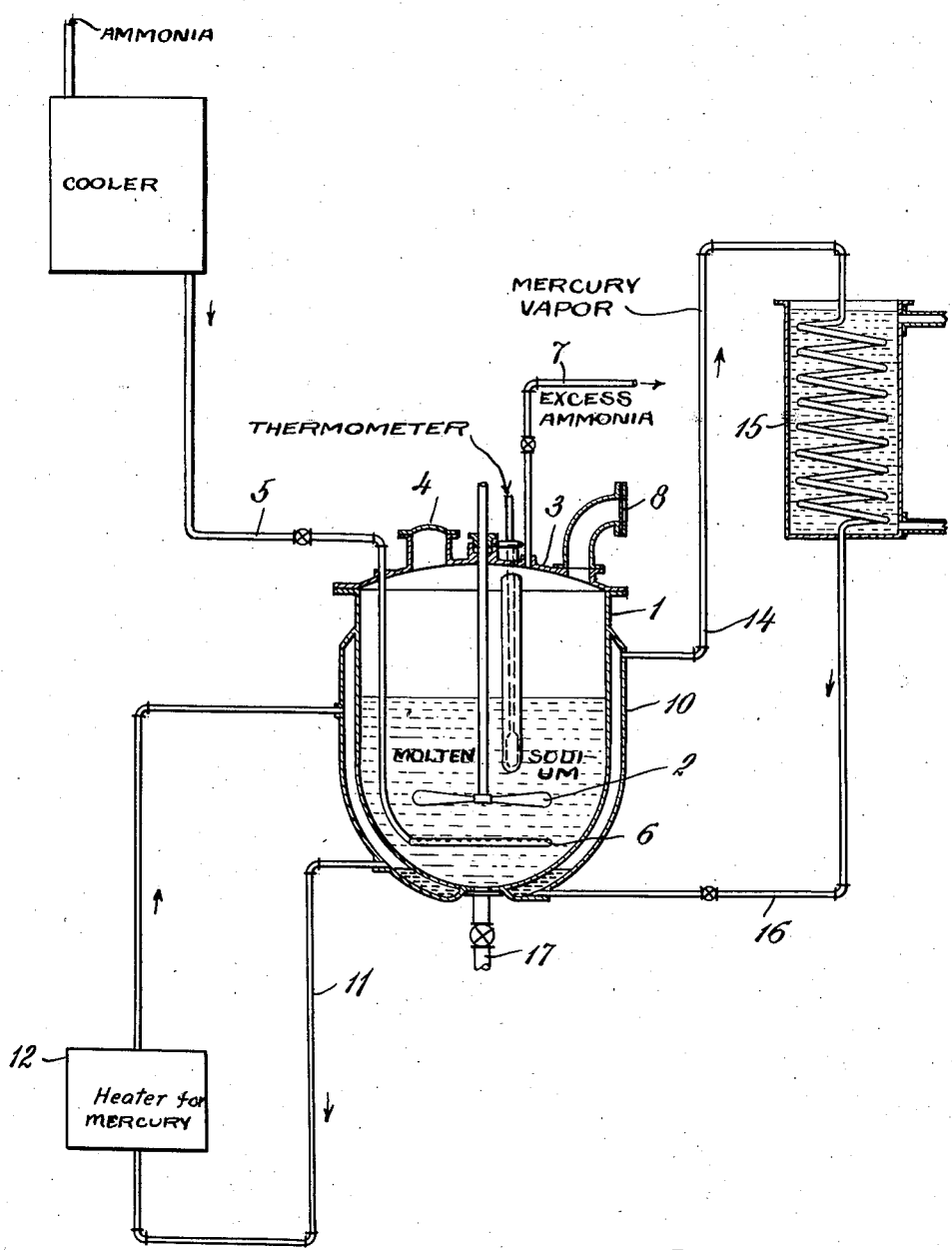

Patented Oct. 18, 1927.

1,646,372

UNITED STATES PATENT OFFICE.

JUSTIN F. WAIT, OF NEW YORK, N. Y., ASSIGNOR TO NATIONAL ANILINE & CHEMICAL CO., INC., A CORPORATION OF NEW YORK.

PROCESS OF PRODUCING SODAMIDE.

Application filed December 18, 1924. Serial No. 756,801.

In the prior process of producing sodamide, metallic sodium was melted in a closed vessel and air excluded, then ammonia gas was passed through the molten mass causing the reaction to take place to produce sodamide, $NaNH_2$. Danger of explosions arise in this process due in part to the fact that moisture was often contained in the ammonia gas. It was also observed at stages of the process that a vacuum was formed probably due to the rapid absorption of the gases by the molten mass thus sometimes causing air to be drawn into the reaction vessel and causing fire or explosion. The reaction to produce sodamide from sodium and ammonia is highly exothermic so that care must be exercised to prevent the temperature from rising too rapidly. The large evolution of heat is apt to give difficulties especially on large scale production and to require great care and skill in the manipulation of the apparatus to carry out the process satisfactorily. The reaction between ammonia gas and sodium takes place very slowly at the melting point of sodium so that it is necessary to increase the temperature to about 280° C. before appreciable reaction can be caused to take place. The prior process was usually carried out at a temperature between about 330° and 375° C.

By the present invention prior difficulties and dangers are obviated or minimized and I am enabled to carry out the process of producing sodamide from sodium and ammonia gas on a very large scale production in a satisfactory manner. By this invention sodium is melted in a vessel from which air may be excluded and the ammonia gas which is introduced is dried by reducing its temperature before being introduced. The ammonia gas may, however, be dried by permitting the moisture to be absorbed as, for example, by the use of caustic or calcium chloride or the temperature of the gas may be decreased sufficiently to cause the moisture to condense out. Sufficient moisture may be condensed out at a temperature of about 5° C.

Another feature of this invention is the use of mercury for conveying heat to the sodium to increase the temperature to the desired amount and also the use of mercury to remove heat of reaction to prevent the temperature from rising too much. Mercury boils at about 357° C. so that by the use of mercury the temperature can be readily controlled especially since the boiling point temperature of mercury can be increased or decreased by using pressure or vacuum. Another feature of this invention is the control of the rate of admission of the ammonia gas to the molten sodium in such a manner as to procure advantageous results. It has been found in actual practice that when about one-fifth of the sodium has been converted to sodamide, the rate of ammonia gas absorption or combination with the sodium increases very rapidly so that the rate of supply of ammonia gas should be correspondingly regulated. It has also been found that agitation of the molten mass during the introduction of the ammonia gas causes the absorption to take place more rapidly.

A convenient arrangement of apparatus for carrying out the process is somewhat diagrammatically illustrated in the accompanying drawing.

In the drawing reference character 1 indicates a reaction vessel that is provided with a stirrer 2. This vessel is closed by means of a cover 3 which has an admission port 4 for charging sodium. The reaction vessel 1 is also provided with an inlet pipe 5 for ammonia gas which inlet pipe extends nearly to the bottom of the vessel and is provided with perforated outlet 6. A valved outlet pipe 7 is provided for excess ammonia and the vessel is provided with a safety blank or disc 8 which will be easily ruptured when the pressure reaches a fixed maximum, say about 5 pounds.

The lower part of the reaction chamber 1 is surrounded with a jacket 10 in which mercury may be placed. An overflow pipe 11 leads from the proper height on the jacket 10 to permit the desired amount of mercury to collect in the jacket. This overflow pipe leads to the mercury boiler 12 from which the vapors rise into the jacket 10, the vapors condensing and thus heating the reaction chamber 1. The jacket 10 is also provided with an outlet pipe 14 which leads to a condenser 15 from which a return pipe 16 leads back to the lower part of the jacket 10. An outlet 17 is provided at the lower part of the reaction chamber 1 for withdrawing the final reaction products.

In operating the apparatus, sodium is charged through the inlet port 4 and the mercury is heated in the boiler 12 to cause the vapors to rise into jacket 10 and melt the sodium. When the temperature of the molten sodium has been increased to the proper point, ammonia gas is introduced through the pipe 5 and bubbles through the molten sodium which is at the same time agitated by means of the agitator 2. The unabsorbed ammonia gas together with evolved hydrogen passes out through the pipe 7 and may be recovered and reused. As soon as the excess heat of reaction causes the temperature to become too high, the vapors pass through the pipe 14 and are condensed by the condenser 15 and the condensed liquid returns through the pipe 16 to maintain proper rate of removal of heat. If an explosion occurs due to any cause so as to increase appreciably the pressure inside the vessel 1, the disc 8 is ruptured to relieve the pressure. This disc is made of large area so as to assure that the pressure will be promptly relieved.

The pressure inside the reaction vessel 1 is preferably kept above atmospheric so as to avoid the danger of air entering the chamber. After the reaction has been completed the sodamide is withdrawn through the outlet 17 and then cold ammonia gas is passed through the pipe 5 for a sufficiently long time to reduce the temperature to below 120° C. after which temperature it is safe to introduce another charge of sodium through the inlet port 4.

A specific control method developed to give a high capacity included feed of ammonia gas while maintaining the sodium at temperatures above 280° C., applying external heat and cessation of the external heat when the temperature had reached approximately 325° C. The flow of gas was continued carrying the temperature to above 375° C. and the reaction continued at temperatures between that and 425° C. In order to insure rapid heating by reason of the reaction between 280° C. and 375° C., I find it desirable to feed a large excess of ammonia gas so that the effluent from the reaction zone contains between 40 and 60% ammonia gas by volume. It was found that with an excess gas less than this the reaction temperature was not increased as rapidly as desired. After this period of feeding excess ammonia has been completed, during which time about 20% of the total gas may have been fed, it was found desirable to regulate the gas feed so that a smaller excess of ammonia occurred in the effluent gas. The excess gas can be recovered and regenerated effecting operating savings. During this period the excess ammonia in the effluent gases can be kept below 10% by volume due to the fact that by proper control a high rate of reaction was obtained without feeding an appreciable quantity of excess gas and usually while applying cooling means. Toward the end of the reaction the concentration of sodium had so decreased that the total amount of heat evolved became smaller with reference to the radiation or cooling of the charge. It was found desirable, therefore, to decrease the rate of cooling during the latter portion of the cycle and it was possible to control the feed and cooling means so that practically the entire reaction was finished before the temperature had decreased from the normal reaction temperature above 375° to 350°.

I claim:

1. The process of producing sodamide which comprises melting sodium and passing ammonia gas therethrough after said gas has been cooled below 5° C.

2. The process of producing sodamide which comprises agitating sodium while at a temperature between 385° C. and 410° C. and passing sufficient ammonia gas therethrough to cause gas bubbles to rise through the mass.

3. The process of producing sodamide which comprises agitating sodium while maintaining its temperature between 380° C. and 410° C. and passing ammonia gas therethrough and removing heat of reaction as latent heat of vaporization of mercury.

4. The process of producing sodamide which comprises passing ammonia gas through sodium at a temperature between 385° C. and 425° C. at a pressure between one and five pounds above atmospheric.

5. The process of producing sodamide which comprises passing ammonia gas through sodium at a temperature between 385° C. and 425° C. and suddenly releasing gases causing pressure above three pounds.

6. The process of producing sodamide which comprises cooling ammonia gas below 5° C. and passing it into sodium at a temperature between 385° C. and 410° C. whereby the cool gas aids in absorbing heat of reaction.

7. The process of producing sodamide which comprises passing ammonia gas through sodium at a temperature between 375° C. and 425° C. while producing a substantially homogeneous mass of sodium and sodamide by agitation.

8. The process of producing sodamide which comprises increasing the temperature of sodium to above 280° C. applying heat from an external source and passing ammonia gas therethrough until the temperature reaches about 325° C. and increasing the temperature to above 375° C. by passing ammonia gas therethrough.

9. The process of producing sodamide which comprises passing ammonia gas through sodium at a temperature between 280° C. and 370° C. at such a rate that at least 40% by volume of the total effluent gases are ammonia, during which time less than 25% of the sodium is converted, and passing ammonia gas through the sodium at temperatures above 380° C. at such a rate that not more than 10% by volume of the effluent gases are ammonia, at least 50% of the initial sodium being converted at temperatures above 380° C.

10. The process of producing sodamide which comprises passing ammonia gas through sodium at a temperature between 390° C. and 425° C.

11. The process of producing sodamide which comprises introducing sodium into a closed reaction zone, introducing ammonia gas, heating and melting the sodium, bubbling ammonia gas through the molten sodium while the temperature thereof is rising and wherein the effluent gas from the reaction zone contains an excess of 40 per cent of ammonia by volume while the first 20% of the ammonia is being fed and feeding ammonia at a rate during the remainder of the feed so that the effluent gas contains less than 10% of ammonia by volume.

In testimony whereof I affix my signature.

JUSTIN F. WAIT.